A. M. BUTZ, DEC'D.
E. E. BUTZ, EXECUTRIX.
TEMPERATURE REGULATING APPARATUS.
APPLICATION FILED JULY 12, 1904.
No. 910,269. Patented Jan. 19, 1909.
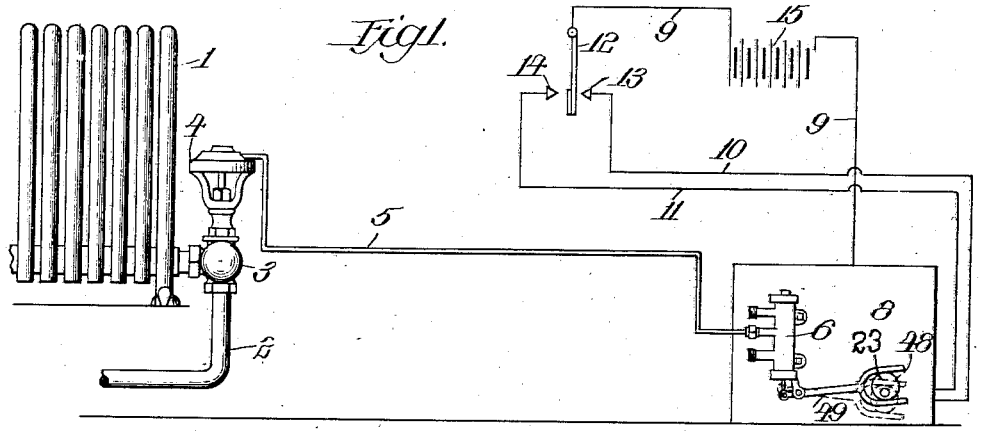
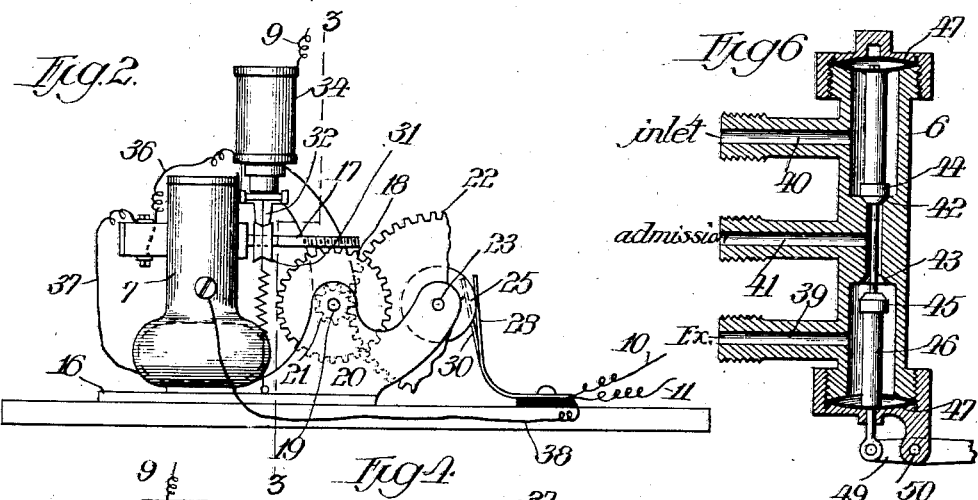
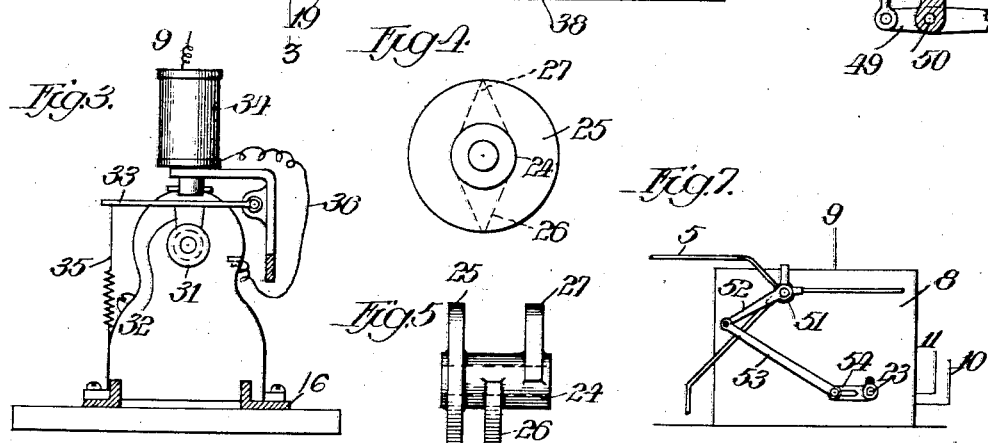
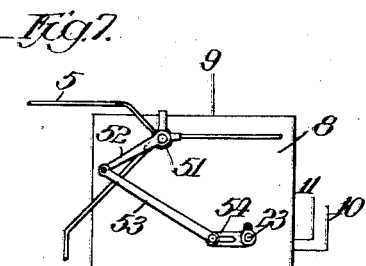
Witnesses:
Edw. R. Barrett
Louis B. Erwin
Inventor
A. M. Butz
By Rector & Hibben
His Atty's

UNITED STATES PATENT OFFICE.

ALBERT M. BUTZ, OF OAK PARK, ILLINOIS; ELLA ELIZABETH BUTZ, EXECUTRIX OF SAID ALBERT M. BUTZ, DECEASED, ASSIGNOR, BY MESNE ASSIGNMENTS, TO H. E. BULLOCK, OF CHICAGO, ILLINOIS.

TEMPERATURE-REGULATING APPARATUS.

No. 910,269.   Specification of Letters Patent.   Patented Jan. 19, 1909.

Application filed July 12, 1904. Serial No. 216,256.

*To all whom it may concern:*

Be it known that I, ALBERT M. BUTZ, a citizen of the United States, residing at Oak Park, in the county of Cook and State of Illinois, have invented certain new and useful Improvements in Temperature-Regulating Apparatus, of which the following is a specification.

My invention relates to temperature regulating apparatus used in connection with heating devices, and the object thereof is to provide novel and efficient means under the control of the thermostat for governing the admission of a heating fluid to a radiator or the like, or the admission of air to a furnace, according to the particular application of my invention.

The construction and arrangement of my mechanism or apparatus are such that it can be readily applied to heating systems or devices, either at the time of the installation thereof or at any time thereafter and be adapted to control the entire heating plant or system simultaneously, that is as a unit, or to control any particular portion or portions of such plant.

In the present instance my mechanism is operated by an electric motor whose current is controlled by a thermostat and which is itself adapted to operate an actuating valve to admit and release a fluid under pressure for actuating a movable abutment (piston or diaphragm) for the purpose of moving a valve to admit fluid to a radiator or to open the damper of a furnace, as the case may be.

My invention also provides means for braking or stopping the electric motor at the proper instant and thereby preventing overthrow of the actuating valve, such means, in the present instance, consisting of an electrically controlled brake associated with the motor in such manner as to normally hold its armature against rotation but adapted to be removed from braking position when current is admitted to the motor, for which purpose such braking device is preferably interposed in the motor circuit.

My mechanism or apparatus is comparatively simple and inexpensive and easily taken care of and easily installed in connection with heating plants to control them as a unit or to control independent parts thereof.

The power or pressure employed in the present instance to actuate the movable abutment is water pressure, which is readily obtainable at practically all points or rooms in a building, so that the necessary power is at hand without installing or leading power throughout a building as when compressed air is used. However, in its broader aspect my invention is not restricted to water pressure as the actuating medium or fluid.

The various features of novelty and utility of my new and improved apparatus will be clearly apparent from the description hereinafter given, taken in connection with the drawings.

In the drawings, Figure 1 is a view more or less diagrammatic showing the general arrangement and association of the various parts of my apparatus as applied to a radiator; Fig. 2 an elevation of an electric motor constructed and arranged to govern the admission of fluid pressure to the movable abutment governing the radiator valve in the particular construction illustrated; Fig. 3 a sectional elevation on the line 3 of Fig. 2 illustrating more particularly the braking apparatus; Figs. 4 and 5 detail views of the circuit closer; Fig. 6 a section of the water valve which is operated or controlled by the electric motor, and Fig. 7 an elevation of a modified form of water valve and operating connections with the electric motor.

It will be understood, as hereinbefore suggested, that my invention may be applied to heating systems generally, either to an ordinary steam or hot water heating system or to a furnace, and that consequently my invention is not to be understood as limited or restricted to either one of such systems, or any particular heating system, although I have chosen to show my invention as applied to a steam or hot water heating system.

Referring to the preferred form of construction, I have illustrated in Fig. 1, in a diagrammatic manner, the relative arrangement and association of the different parts composing my apparatus or mechanism as applied to a radiator of a steam or hot water system. As shown, the radiator 1 is provided with the usual heating fluid pipe 2 governed by a valve 3 of the usual and well known construction and therefore not requiring detailed illustration or further description. Likewise the movable abutment 4, which operates and is connected to such valve 3, is of the usual and well known construction, the same being ordinarily a diaphragm. The fluid under pressure, which may be water, air or other fluid, is supplied to the movable abutment through a pipe marked 5, the supply thereto being governed by valve mechanism contained within a casing 6 having inlet and outlet ports and an admission port communicating with the pipe 5 in a manner hereinafter more particularly described. Within this casing is contained a valve governing said ports and operatively connected to an electric motor 7 contained within a box or casing 8. This electric motor is interposed in a three-wire electrical circuit composed of the wires or connections 9, 10 and 11, in which circuit is also interposed a suitable construction of thermostat having a movable member 12 and the fixed members or terminals 13 and 14. These terminals are connected with the wires 10 and 11 respectively, while the member 12 of the thermostat is connected with the wire 9 and with a generator, which in the present instance is shown as a primary battery 15, arranged in the connection 9.

From the foregoing general description of the parts composing my apparatus it will be understood that the opening and closing of the valve 3 of the radiator is governed by the movements of the valve mechanism 6, which will hereinafter be termed the water valve, to distinguish it from other parts, especially in view of the fact that water is the actuating fluid preferably employed. This water valve is in turn operated and controlled by the electric motor, whose movements are governed by the thermostat.

Referring now to the construction of the parts, the electric motor 7 is of any usual construction, the same being preferably mounted upon a base plate 16 and contained or inclosed within the box or casing 8. The armature shaft 17 of the motor is extended and at its outer end formed as a worm arranged to mesh with a worm gear 18 secured to a shaft 19 mounted in suitable bearings in a frame 20 rising from the base plate 16. To this shaft 19 is secured a pinion 21 arranged to mesh with a gear wheel 22 secured to a shaft 23 also journaled in the motor frame 20. It will be understood that the movements of the motor are communicated through the worm and worm gear to the shaft 23, but that the rotations are considerably reduced.

Upon the shaft 23 is secured a hub 24, shown in detail in Fig. 5 and preferably formed of conducting material. This hub is provided with a disk 25 and with two similar but oppositely disposed sectors 26 and 27. This hub structure constitutes what I term a circuit breaker, inasmuch as it serves the purpose of controlling the opening and closing of the circuit, thereby supplying or cutting off the current to the motor. A series of three spring brushes 28, 29 and 30 coöperate with the disk 25 and the two sectors respectively, the brush 28 being at all times in contact with the disk 25, while the other brushes are alternately in contact with their respective sectors according to the starting position of the hub 24 as determined by the movements of the motor; that is to say, owing to the opposite positioning of the sectors only one of such sectors will be in contact with its brush at any one time. For instance, as shown in Fig. 5, the brush 29 is in contact with its sector 26 while the other brush 30 is out of contact with its sector 27. The brush 28 is electrically connected indirectly through the motor windings with the wire or connection 9 which contains the generator or battery, while the brushes 29 and 30 are connected with the wires 10 and 11 respectively and therefore with the terminals 13 and 14 respectively of the thermostat.

For the purpose of stopping the armature shaft at the proper instant, that is immediately upon the cutting off of the current to the motor, I provide means for braking such armature shaft, which means are electrically controlled by being interposed or arranged in the same electrical circuit as the motor. In the present instance such means are designed to act directly upon the armature shaft, which is provided with a brake wheel 31, circumferentially grooved as indicated in Fig. 2. With this brake wheel coöperates a friction surface or shoe 32, which is formed on the under side of a pivoted armature of an electro-magnet 34, which magnet is arranged in the same electrical circuit as the motor. This brake shoe is held against the brake wheel with a yielding pressure in suitable manner, as by means of spring 35 connected to a fixed part of the motor or its base plate and to the armature 33 respectively. Normally magnet 34 is not energized for current is not normally supplied to the motor, but the arrangement is such that when the current is supplied thereto and the magnet 34 thereby energized, the armature 33 will be attracted by the magnet against the tension of spring 35, with the result that the brake shoe will be withdrawn from operative relation with the brake wheel and the armature shaft 17 thereupon be permitted to turn. The armature will be held in such elevated position so long as current is admitted to the motor, but just as soon as current is cut off, the magnet becomes deënergized, whereupon the armature will be retracted to normal position by means of its spring 35, thereby bringing the brake shoe against the brake wheel 31 and stopping the motor. In this manner the motor will be stopped with precision with either one or the other of its sectors in electrical connection with its brush.

It will be understood that the electrical connection may be made between the circuit closer and the motor and electro-magnet in the usual and well known manner, and it will therefore suffice to say that the wire or connection 9 is connected with the electro-magnet as indicated in Figs. 2 and 3 and thence to one of the brushes of the motor through the wire or connection 36. The other brush is connected by means of wire 37 with the fields of the motor and such fields are also connected with the brush 28 through the wire or connection 38.

Referring next to the water valve and to the preferred form illustrated in Fig. 6, the same comprises a casing 6 having a longitudinal bore or chamber with an exhaust port 39, an inlet port 40 and an admission port 41 connecting with the pipe 5 leading to the movable abutment. As shown, the inlet and exhaust ports are arranged toward the ends of the valve casing, with the admission port 41 entering intermediate the length thereof, the object of the valve mechanism being to alternately open and close the connections between such admission port and the inlet and exhaust ports. To this end such valve casing is provided with the two valve seats 42 and 43, on which are adapted to alternately seat respectively the two valves 44 and 45. These valves are connected together by or formed upon a valve stem or rod 46, which is operatively connected to the motor in the manner hereinafter described. By preference the valve stem is provided at its ends with movable abutments or diaphragms 47. It will be understood that when the ports are in the position indicated in Fig. 6 the valve 44 closes communication between the inlet port 40 and the admission port 41, while the valve 45 is off its seat, thereby permitting communication between the admission port 41 and the exhaust port 39, with the result that the diaphragm device 4 is at exhaust or released position. When, however, the valve stem is forced upwardly (Fig. 6), the valve 45 will be seated, thereby closing the exhaust, and the valve 44 will be opened, thereby establishing communication between the inlet port 40 and the admission port 41, admitting fluid under pressure to such diaphragm device.

As stated, the valve stem 47 is operatively connected with the motor, and to this end the shaft 23, which is rotated by the armature shaft through the gearing already referred to, is extended outside the box or casing 8 and there provided with a cam wheel 48, arranged to coöperate with the bifurcated end of a pivoted lever or rod 49. This lever 49 is pivoted at 50 on one end of the casing 6, with its short arm operatively connected with the valve stem 46, as clearly indicated in Fig. 6. When the small or lean side of the cam is on the under side, as indicated in Fig. 1, the valves will be in the position indicated in Fig. 6, but upon partial rotation of the shaft 23 and the cam wheel 48, so that the larger side of the cam will be on the under side and bearing against the lower arm or branch of the bifurcation of the lever 49, the valve stem will be forced upwardly (Fig. 1).

The operation of my apparatus will be clearly understood after the foregoing description, and it will therefore only be necessary to trace the electrical circuits in the different positions of the parts. When the movable member 12 of the thermostat is moved in contact with the terminal 13 the current is through the wire 9, electro-magnet 34, through the motor, thence to the brush 28, disk 25, hub 24, brush 29 and wire 10 back to the terminal 13. After the motor has operated the water valve, the consequent rotation of the circuit breaker will break the connection between the sector 26 and brush 29 and establish connection between the sector 27 and its brush 30, with the result that the current will be cut off from the motor, and such motor will come to rest with such last named sector in contact with its brush, the proper and exact point of contact being determined by the action of the brake. When in the usual operation of the thermostat the movable member 12 contacts the terminal 14, current will be established through the electro-magnet, motor brush 28, disk 25, hub 24, sector 27 and brush 30 to the wire 11 and thence back to the terminal 14, with the result that the brake will be released and the motor operated to move the water valve and to rotate the hub 24 so as to bring its sector 26 in contact with its brush 29 ready for the next operation.

Instead of the form of water valve illustrated in Fig. 6, it is possible to employ an ordinary three-way valve having operating connection with the shaft 23 of the motor device. As shown in Fig. 7, the three-way valve 51 is provided with a crank arm 52 operatively connected by means of link 53 with crank arm 54 secured to such shaft 23. The mode of operation of such valve device will be readily understood and therefore no specific description thereof will be given.

I claim:

1. In temperature regulating apparatus, the combination, with a movable fluid pressure actuated abutment for controlling a heating device, of thermostatically controlled mechanism for governing the admission and release of fluid under pressure to operate such abutment comprising, in connection with a thermostat, an electric motor in the same electrical circuit as the thermostat, a valve operatively connected with the motor and arranged to control said fluid pressure, and a circuit breaker operated by the motor and consisting of a disk for constant electrical contact and oppositely arranged sectors formed of one piece of metal, and brushes coöperating with the disk and sectors and arranged in said circuit those brushes which coöperate with the sectors being free except when in contact therewith to close circuits therethrough.

2. In temperature regulating apparatus, the combination, with a movable fluid pressure actuated abutment for controlling a heating device, of thermostatically controlled mechanism for governing the admission and release of fluid under pressure to operate such abutment comprising, in connection with a thermostat, an electric motor in the same electrical circuit as the thermostat, a valve operatively connected with the motor and arranged to control said fluid pressure, and a circuit-breaker operated by the motor and consisting of a metallic hub having integrally formed thereon a disk for constant electrical contact and two oppositely arranged sectors for alternate electrical contact and brushes coöperating with the disk and sectors and arranged in said circuit those brushes which coöperate with the sectors being free except when in contact therewith to close circuits therethrough.

3. In temperature regulating apparatus, the combination, with a movable fluid pressure actuated abutment for controlling a heating device, of thermostatically controlled mechanism for governing the admission and release of fluid under pressure to operate such abutment comprising, in connection with a thermostat, an electric motor in the same electrical circuit as the thermostat, a valve operatively connected with the motor and arranged to control said fluid pressure, and a circuit-breaker arranged to be rotated by the motor and consisting of a hub having a disk for constant electrical contact and two sectors for alternate electrical contact and brushes electrically connected with the thermostat and with a source of electricity, one of such brushes being constantly in contact with the disk and the others thereof being alternately in contact with their respective sectors those brushes which coöperate with the sectors being free except when in contact therewith to close circuits therethrough.

4. In temperature regulating apparatus, the combination, with a movable fluid pressure actuated abutment for controlling a heating device, of thermostatically controlled mechanism for governing the admission and release of fluid under pressure to operate such abutment comprising, in connection with a thermostat, an electric motor and arranged to control said fluid pressure, in the same electrical circuit as the thermostat, a valve operatively connected with the motor through the medium of an eccentric, the armature of such motor having a worm, a worm gear and pinion driven thereby, a gear wheel driven by the pinion, and a circuit breaker arranged in said circuit and operatively connected with said gear wheel.

5. A thermostatic switch comprising an expansible member and electric terminals, one of such terminals movable and the position thereof controlled by the position of the expansible member and the remaining terminals immovable, in combination with an electric motor, a rotatable shaft, a disk for constant electrical contact and two oppositely placed sectors secured on the rotatable shaft for alternate electrical contact, such disks and sectors constituting electric conductors and all connected with the same hub piece, a mechanical connection between the motor and the shaft to turn the shaft by the turning of the motor, electric brushes adjacent to the disk and sectors, respectively, one of such brushes in constant electrical contact with the disk and the remaining brushes alternately in electrical contact with the sectors adjacent thereto, an electric conductor connecting the brush in contact with the disk to the movable electric terminal, an electric generator, such generator and the motor interposed on such conductor, and additional electric conductors respectively connecting the immovable electric terminals to the brushes adjacent to the sectors.

6. A thermostatic switch comprising an expansible member and electric terminals, one of such terminals movable and the position thereof controlled by the position of the free end of the expansible member and the remaining terminals immovable, in combination with an electric motor, provided with a screw on the shaft of the armature thereof, a gear intermeshing with the screw, a pinion attached to the gear to rotate therewith, an additional gear intermeshing with the pinion, such additional gear rigidly secured to a rotatable shaft, a disk and two oppositely placed sectors secured on the rotatable shaft to turn therewith, such disk and sectors being formed integral with a hub piece and constituting electric conductors, electric brushes adjacent to the disk and sectors, respectively, one of such brushes in constant electrical contact with the disk and the remaining brushes alternately in electric contact with the sectors adjacent thereto, an electric conductor connecting the brush in contact with the disk to the movable electric terminal, an electric generator, such generator and the motor interposed on such conductor, and additional electric conductors respectively connecting the immovable electric terminals to the brushes adjacent to the sectors.

7. In temperature regulating apparatus, the combination, with a movable abutment for controlling a heating device, of thermostatically controlled mechanism for governing the admission and release of fluid under pressure to operate such abutment comprising, in connection with a thermostat, an electric motor in the same electrical circuit as the thermostat, a valve operatively connected with the motor, and means for braking the armature shaft of the motor to prevent overthrow of the valve comprising an electro-magnet in the same electrical circuit as the motor, an armature for the magnet provided with a shoe or friction surface, and a circumferentially grooved brake wheel secured to the armature shaft and coöperating with the shoe.

8. In a temperature regulating apparatus, the combination with a controller for a heating device, of thermostatically controlled mechanism arranged to govern the operation of said controller, said mechanism comprising a thermostat, a circuit changer, an electric motor controlled by said thermostat and operatively connected with said controller and said circuit changer, said circuit changer consisting of a metallic disk and sectors arranged along the axis of a hub and in direct metallic connection with each other, and brushes coöperating with said disk and sectors.

ALBERT M. BUTZ.

Witnesses:
S. E. HIBBEN,
LOUIS B. ERWIN.